(12) United States Patent
Rachlin

(10) Patent No.: US 6,885,967 B2
(45) Date of Patent: Apr. 26, 2005

(54) SPACECRAFT DEPRESSURIZATION ANALYZER

(75) Inventor: Elliott H. Rachlin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/602,148

(22) Filed: Jun. 23, 2003

(65) Prior Publication Data

US 2004/0260485 A1 Dec. 23, 2004

(51) Int. Cl.[7] .................. G01L 11/00; G06F 15/00; G01F 23/14
(52) U.S. Cl. .................. 702/138; 73/40.7; 73/49.2; 123/520; 702/51
(58) Field of Search .................. 702/50, 51, 138, 702/140; 73/40, 40.5, 40.7, 49, 49.1, 49.2, 170.25; 123/520; 156/242

(56) References Cited

U.S. PATENT DOCUMENTS

| 3,763,691 | A | * | 10/1973 | McMaster et al. ....... 73/170.25 |
| 4,510,792 | A | * | 4/1985 | Morel et al. .................. 73/40.7 |
| 5,363,695 | A | * | 11/1994 | Jensen ........................ 73/49.2 |
| 5,553,483 | A | * | 9/1996 | Armentrout et al. ........... 73/40 |
| 5,961,764 | A | * | 10/1999 | Sydow et al. ............... 156/242 |
| 6,216,674 | B1 | * | 4/2001 | Corkill ........................ 123/520 |
| 6,549,857 | B1 | * | 4/2003 | Fierro et al. .................. 702/51 |

* cited by examiner

*Primary Examiner*—John Barlow
*Assistant Examiner*—John Le

(57) ABSTRACT

Methods and apparatus are provided for analyzing spacecraft depressurization events. The apparatus comprises a memory configured to store information relating depressurization aperture sizes to feeding volumes and to first derivatives of pressure with respect to time; and information relating to a volume of the at least one compartment. The apparatus further comprises a processor coupled to the memory and configured to receive pressure signals and temperature signals representative of the temperature and pressure in the vessel, detect depressurization from a first derivative of pressure with respect to time calculated in response to the pressure signals, calculate a feeding volume from the compartment volumes, the pressure signals, and the temperature signals and determine a depressurization aperture size using the first derivative of pressure with respect to time responsive to detection of depressurization and the feeding volume.

53 Claims, 7 Drawing Sheets

SPACECRAFT DEPRESSURIZATION ANALYZER

FIELD OF THE INVENTION

The present invention generally relates to spacecraft safety and more particularly relates to a method and apparatus for detecting air leaks and estimating parameters related to air leaks from a spacecraft into outer space.

BACKGROUND OF THE INVENTION

One of the hazards of manned spaceflight is an air leak in an air-pressurized spacecraft which may, in some cases, compel an evacuation of the spacecraft. On large spacecraft, such as the International Space Station (ISS), leaks on the order of 0.25 inches diameter or less may provide opportunities for repair, while larger leaks may not. Some leaks may go undetected for an undesirable period, during which the size of the leaking aperture may erode to become a larger leak. Prognostic temporal parameters relating to the leak are desired to support decision-making by the mission commander and ground support personnel. Current methods and apparatus do not provide the information desired.

Research has been done on rates at which air will leak from a spacecraft, given a particular feeding volume and leak aperture size. NASA, in particular, has done research in the field of spacecraft air leaks and produced pressure vs. time curves for leaks of various aperture sizes as functions of feeding volume. However, this research has yet to find practical application.

During a postulated air leak event in a manned spacecraft, the attention of the crew may be highly focused on immediately responsive measures and verbal communications to ground support personnel may be uninformative or absent. The ground support personnel may need information on crew activities to ensure quality support. For example, the flight crew of the ISS may close hatches (which have no dedicated telemetry) between ISS compartments and fail to communicate this to ground personnel. Ground personnel may be able to contribute to the solution if they have adequate information, but, without additional information, may not know which hatches have been closed.

Accordingly, it is desirable to provide a system and a method to detect a leak, determine the size of the leak, determine a rate of change of the size of the leak, and to detect hatch openings and closures. In addition, it is desirable to communicate this information in a timely manner to the flight crew and to ground personnel. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for analyzing spacecraft depressurization events. The apparatus comprises a memory configured to store information relating depressurization aperture, or hole, sizes to feeding volumes and to first derivatives of pressure with respect to time; and information relating to a volume of the at least one compartment. The apparatus further comprises a processor coupled to the memory and configured to receive pressure signals and temperature signals representative of the temperature and pressure in the vessel and to detect depressurization from a first derivative of pressure with respect to time calculated in response to the pressure signals. The processor is further configured to calculate a feeding volume from the compartment volumes, the pressure signals, and the temperature signals and to determine a depressurization aperture size using the first derivative of pressure with respect to time and the feeding volume.

A method is provided for analyzing spacecraft depressurization events. The method comprises sensing, over time, a pressure and a temperature within the compartment, detecting depressurization using a first derivative of pressure with respect to time in the compartment calculated from the pressure sensed over time and, if depressurization is detected, determining a feeding volume from the predetermined interior volume, the temperature therein, and the pressure therein and determining a size of a gas exit aperture, or leak, in the compartment based upon the feeding volume and the first derivative of pressure.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention. Thus, while the examples are presented in terms of spacecraft depressurization, the invention may be readily adapted by those of ordinary skill in the art to other purposes ranging from chemical process plants (wherein the role of the hatch may be served by a valve), to submarines and airliners.

Figure 1:
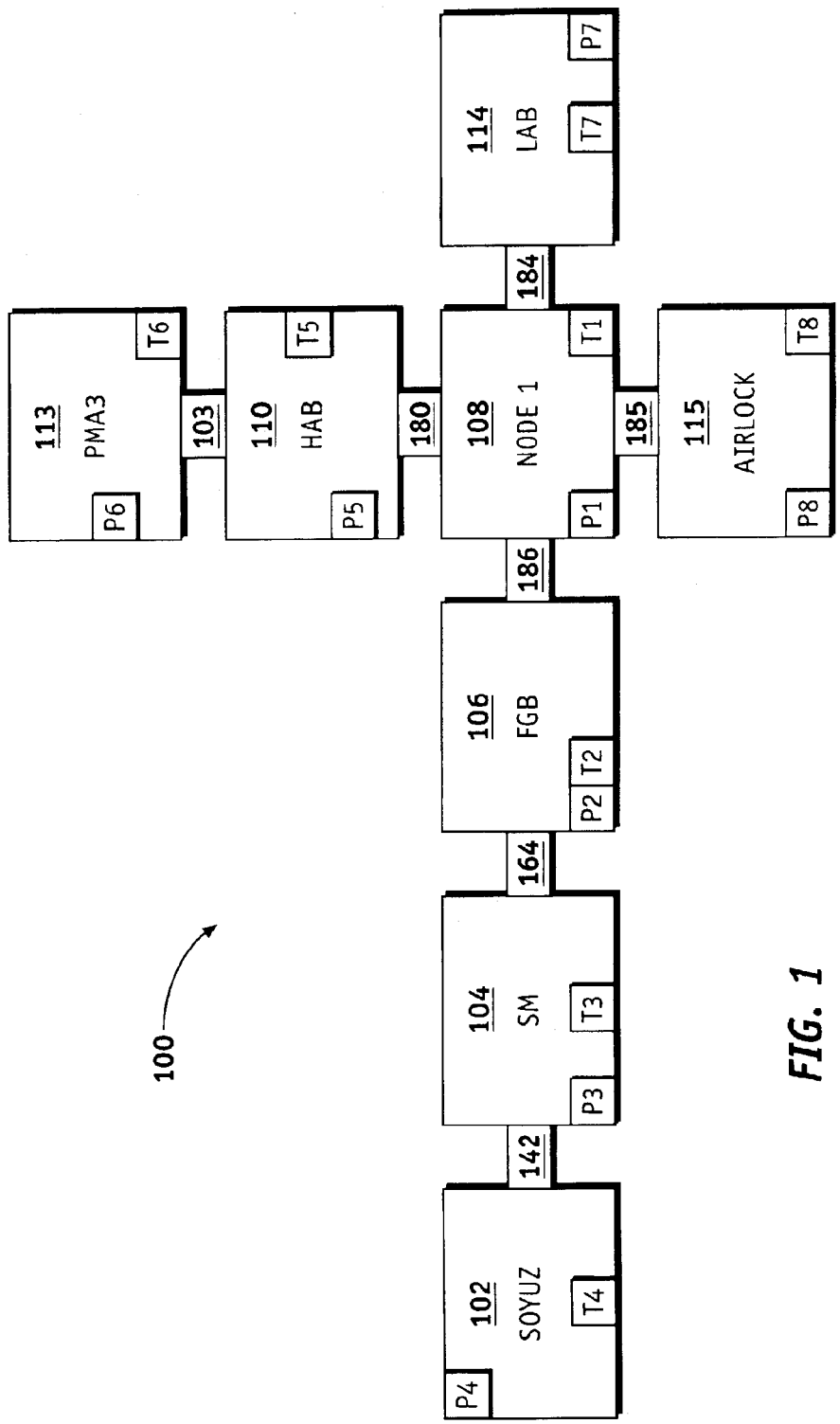
FIG. 1 is a block diagram of an exemplary spacecraft comprising compartment connected by hatches.
Figure 5:
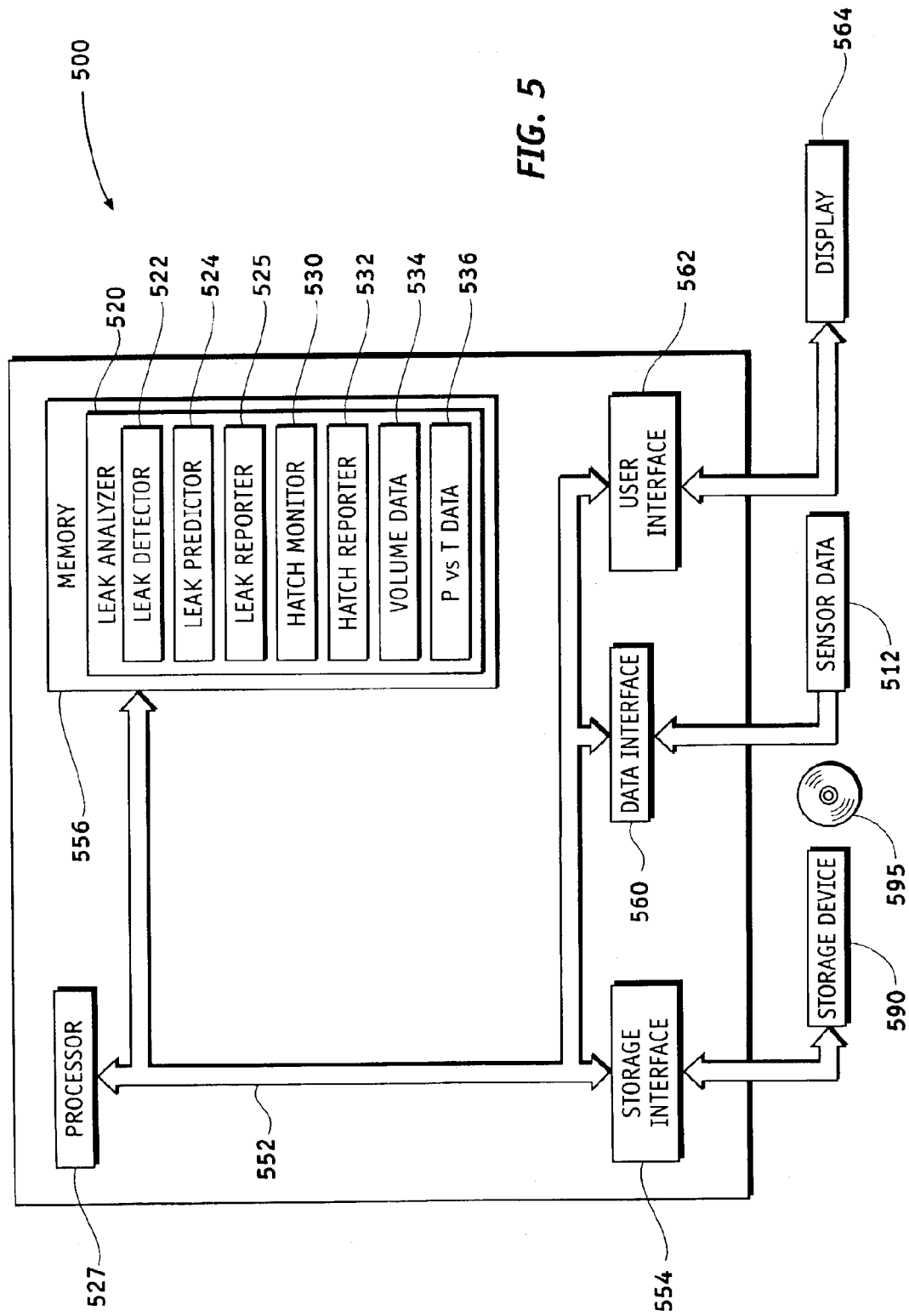
FIG. 5 illustrates an exemplary apparatus for forecasting spacecraft air leak events.

FIG. 1 shows a block diagram of an exemplary spacecraft 100 comprised of eight modules including Soyuz, Service Module, and Node One. Each module has at least one internal compartment 102, 104, 106, 108, 110, 113, 114, or 115. The compartments are connected by hatches 103, 142, 164, 180, 184, 185, 186, which are normally open. A 1:1 ratio of compartments to modules is not a limitation of the present invention. Each compartment 102, 104, 106, 108, 110, 113, 114, and 115, has a predetermined volume and is outfitted with at least one pressure sensor P1–P8 and at least one temperature sensor T1–T8 adapted to be coupled to a processor 27 (FIG. 5). The processor 527 may be any means for automatic computation, whether electronic, fluidic, optical, magnetic or otherwise implemented. Processor 527 may be a dedicated microprocessor chip, distributed circuit, application-specific integrated circuit, firmware, discrete component circuit, or similar alternative to a microprocessor chip, and may be digital or analog.

Pressure sensors P1–P8 and temperature sensors T1–T8 are conventionally included in dockable spacecraft modules, so that the receiving spacecraft crew can determine if there is an appropriate amount of air in the new module to permit opening the hatch. In an embodiment for a system not pre-fitted with sensors, the sensors may be part of the embodiment.

The predetermined volume of each compartment may be updated by a user of an embodiment of the spacecraft depressurization forecaster to compensate for air displaced by stored cargo and supplies. In an alternate embodiment, means for compensating for the air displaced by human beings in the compartment may be included. In a particular alternate embodiment, the presence of a particular human being in a compartment may be sensed and the predetermined volume of the compartment recomputed to compensate for that presence.

When depressurization is detected, the first task is to locate the leak. If all hatches to a single leaking compartment are closed, then that leaking compartment alone will experience a pressure change. It is useful to minimize the number of hatches that are closed when locating a leak, thereby conserving time and air. A method used by embodiments of the spacecraft depressurization analyzer is to close a single hatch and observe pressure changes on each side thereof. For example, by closing hatch 186 and observing pressure changes, one can narrow the search for the leak. If pressure is still dropping in compartment 106 and not in compartment 108, then the leak is in compartment 102, 104, or 106. Closing hatches 103, 180, 184, or 185 is now known to be unnecessary, and closing hatch 142, 164, or both will isolate the leak.

Figure 2:
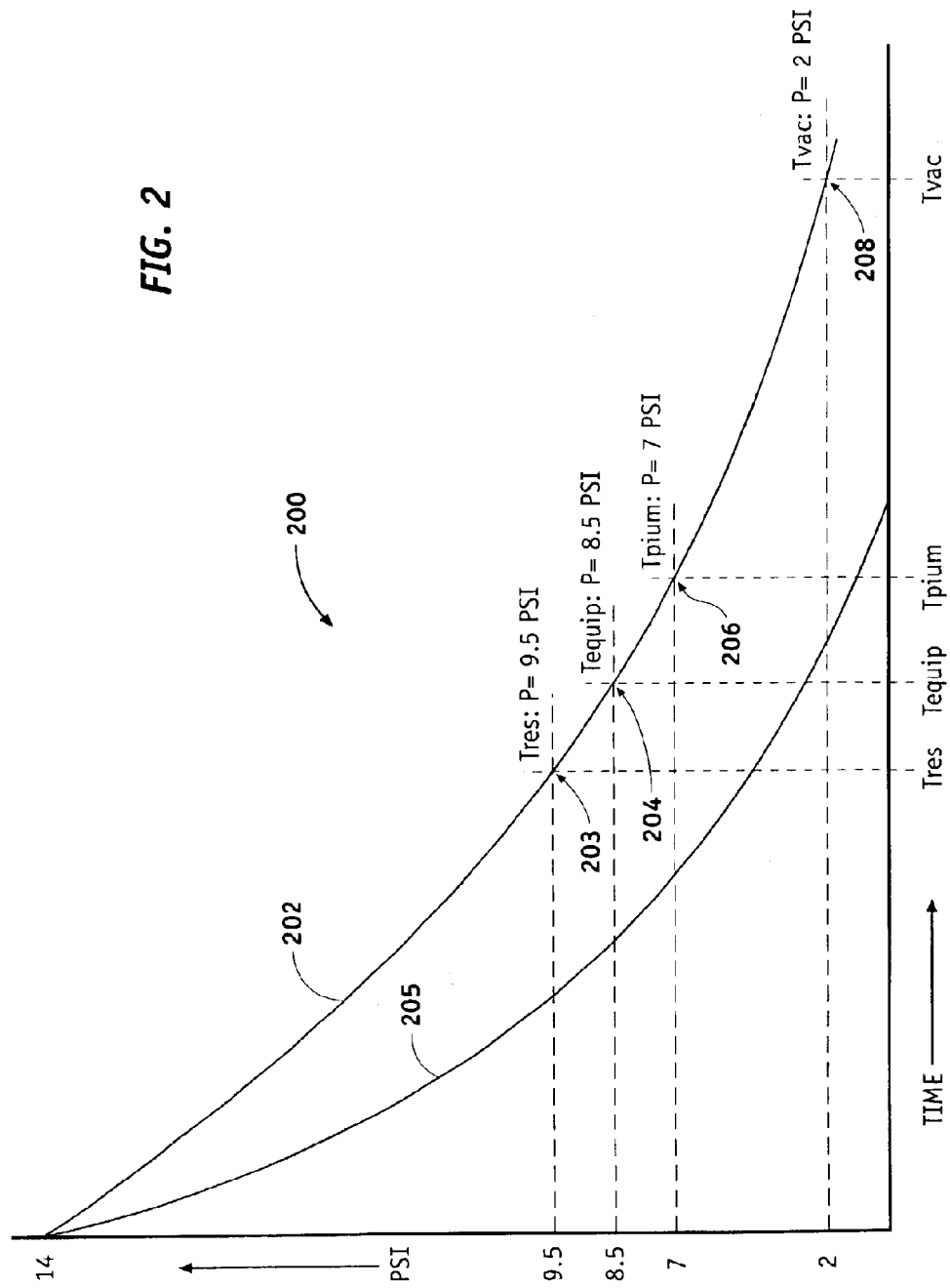
FIG. 2 illustrates pressure vs. time curves for an exemplary leak.

FIG. 2 shows an exemplary depressurization curve 202 on time vs. pressure graph 200. Depressurization curve 202 is the product of a particular feeding volume and a particular size of the hole, or aperture, through which the air is leaking. A feeding volume is calculated from the volume of interest, the pressure of the air in that volume, and the temperature of the air in that volume. This volume may be the sum of volumes of several compartments which may be in fluidic communication by, for example, open hatches. Initially, the volume of interest is the total volume of all compartments summed together.

The method of calculating curve 202 is known from NASA research. Embodiments of the spacecraft depressurization analyzer first determine an estimate of the aperture size from the first derivative of pressure with respect to time and the feeding volume. Given the aperture size and the feeding volume, curve 202 can be determined.

Each curve 202 contains points of particular operational interest to the crew and to ground support personnel attempting to help solve the depressurization problem. The first such point is the point 203 at which the pressure reaches approximately 9.5 psi. At this point, all non-essential personnel are preferably evacuated. The time, Tres, or Treserve, at which the pressure reaches point 203, is the time by which the evacuation should preferably occur. The next point of interest is point 204, which is the point at which there is no longer sufficient air pressure (about 8.5 psi or less) to provide air-cooled equipment, such as electronic equipment, with sufficient cooling. The corresponding time, Tequip, or Teuipment, is the time by which all air-cooled equipment is preferably shut off. At approximately 7 psi, or point 206, there is likely no longer sufficient air pressure for human lungs to function. The corresponding time, Tpulm, or Tpulmonary, is the time by which even essential personnel are preferably evacuated. At point 208, or about 2 psi, the compartment is, for most practical purposes, at a vacuum. The time corresponding to point 208, Tvac, or Tvacuum, is the time when pressurized containers in the compartment which were not designed for high pressure gradients may burst.

The above-noted times are exemplary and adapted to an exemplary embodiment for use with a spacecraft. Other times of operational significance may be added. For example, the time at which the effects of oxygen may inhibit the ability of a crew member to close a hatch may be of interest. For further examples in a different application, the time at which depressurization in a chemical processing chamber will have released an amount of chemical of interest may be of used.

Curve 205 represents, with exaggeration for clarity of illustration, a depressurization curve for a leak aperture that is growing. Curve 205 has a higher second derivative of pressure with respect to time than curve 202. Accordingly, hole growth may be estimated based upon a second derivative test.

Figure 3:
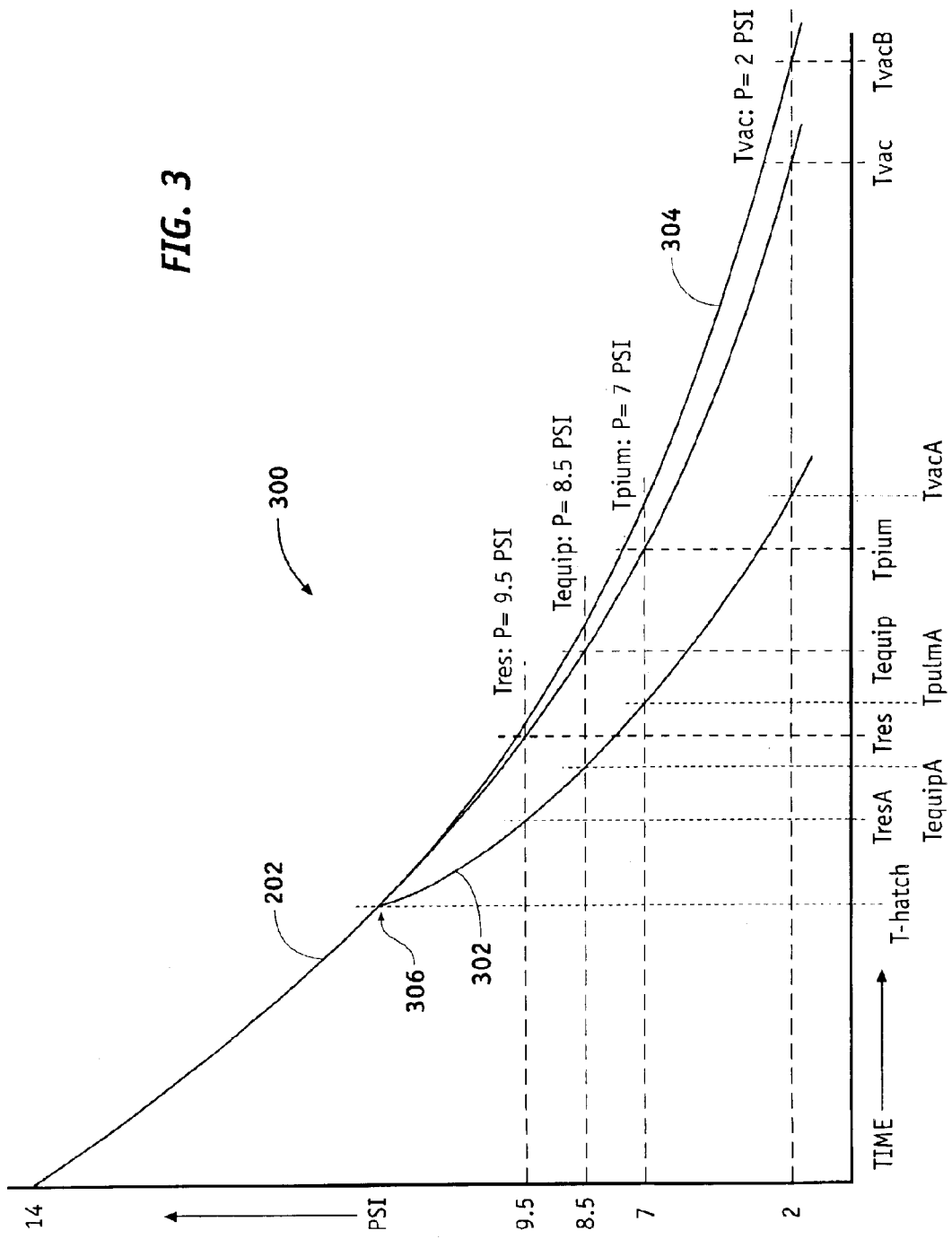
FIG. 3 illustrates the effects of closing and opening a hatch on the exemplary pressure vs. time curve.

FIG. 3 shows pressure vs. time graph 300 having the curve 202. When hatches are closed or opened, the feeding volume available to the leak aperture changes, thereby changing the curve 202. Curve 302 shows the effect of closing a hatch at arbitrary point 306 corresponding to T-hatch. Because closing a hatch shrinks the feeding volume to a leak aperture without changing the initial pressure at the aperture, the pressure drops more quickly 302. The effect of the steeper pressure drop is to shorten times TresA, TequipA, TpulmA, and, TvacA. If the leaking compartment is one of the smaller compartments, closing the hatch can result in large changes in times. For example, for an 0.25-inch diameter leak in the ISS configured as shown in FIG. 1, Tres is on the order of 450 minutes. If that leak is in compartment 113, closing hatch 103 makes TresA for compartment 113 just 4.5 minutes, a reduction by a factor of one hundred. The opposite effect occurs for a compartment or group of compartments when a hatch is opened, as illustrated by curve 304.

Figure 4:
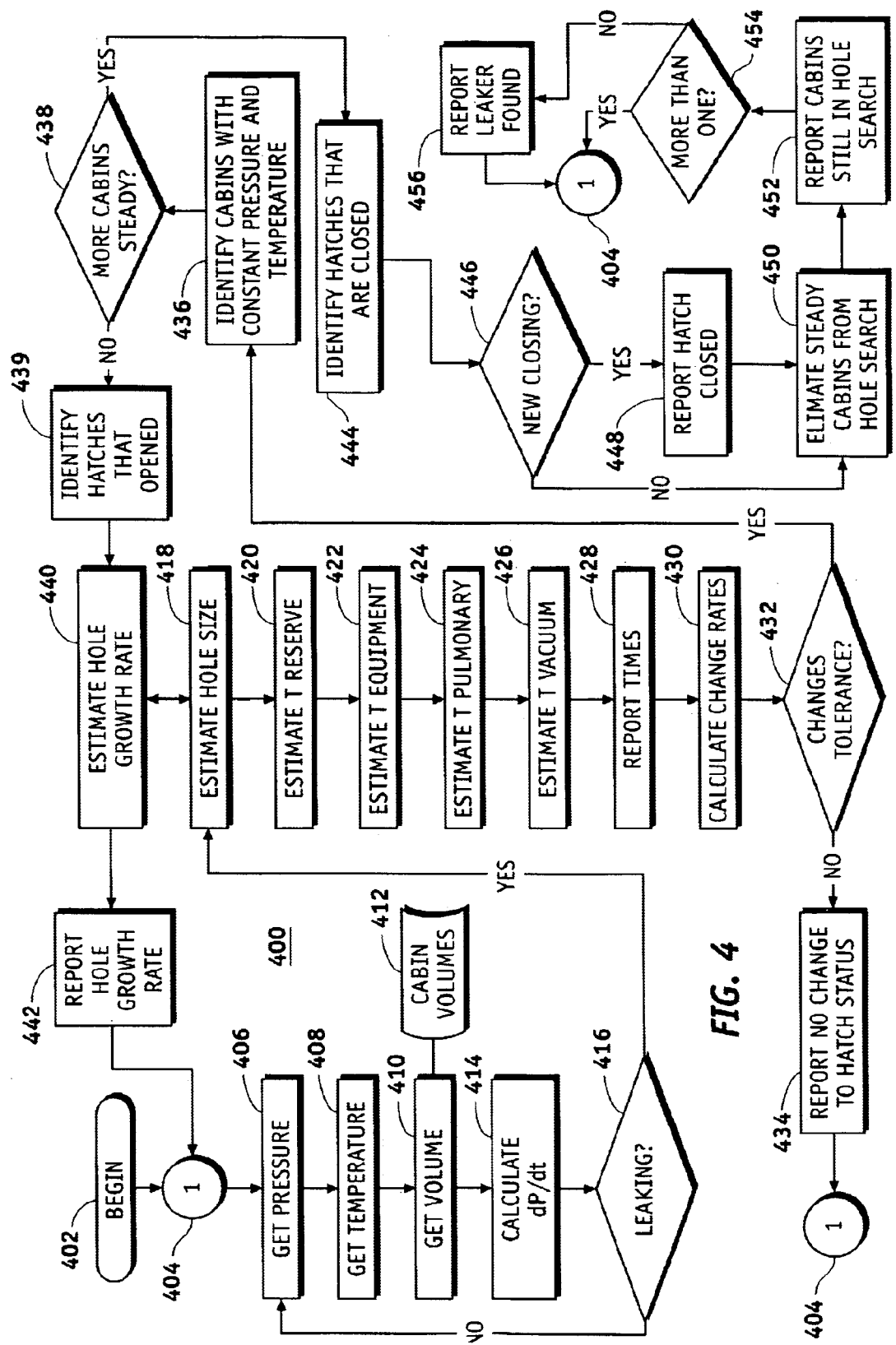
FIG. 4 is a process flow diagram of an exemplary method of forecasting spacecraft air leaks.

FIG. 4 shows a flow chart of an exemplary method 400 for analyzing spacecraft depressurization events. The process begins at step 402 with powering up an embodiment of the spacecraft depressurization analyzer. Step 404 is a null function point of return for this continuously cyclic method 400. The steps of getting pressure 406 measurements, temperature 408 measurements, and calculating 410 the volume may be done in any order or simultaneously. Volume data 412, used for calculation 410 is typically stored in a database or data structure to be readily accessible. Volume data 412 may include the volume for each compartment individually and for each possible combination of contiguous compartments. In most embodiments, the volume data 412 is updatable by the user to compensate for stowage of cargo and/or human occupation. Calculation 410 includes recalculation of the feeding volume after a state change in a boundary hatch. Calculation 410 may include an initial estimate of the volume calculated 410 as a function of known physical quantities, replaced by nearest exact volume selected from possible volumes in volume data 412. For example, a functional volume calculation such as VolumeCF= (2.52659E−16*EstimatedHoleSizeInches*EstimatedHoleSizeInches *CabinPressure* (2.83551E+17+6.16859E+14*CabinTemperture))/(dPdTpsi*sqrt(460.0+CabinTemperature)) may yield a feeding volume of 3,430 cubic feet. A nearest match in exact volume data 412 may be 3,436 cubic feet, a combined volume of the Soyuz module 102 and the Service Module 104. Note that, with the exact volume determined, the equation just given may be rewritten to solve for EstimatedHoleSizeInches in step 418.

The first derivative of pressure with respect to time is calculated 414 based upon at least a pair of sequential pressure measurements and the time between those measurements. When the hatches are open, the sequential pressure measurements may be taken from different sequentially reporting pressure sensors in most embodiments where the frequency of taking measurements is slow compared to pressure change propagation, which is at the speed of sound in air. Statistical methods for smoothing data, as known in the art, may be used to improve the data used in the calculation.

If, in step 416, the first derivative is negative and of significant magnitude over a statistically significant period of time, then it is determined that the spacecraft is leaking, or depressurizing. If it is determined that the spacecraft is not leaking 416, the cycle is restarted at 404. Given a leaking spacecraft, the first step is to estimate the hole, or aperture size in step 418. Note that the aperture need not be, strictly speaking, a hole; cracks, warped seals, faulty valves, or various other leaks are also analyzed. The aperture size is calculated from the feeding volume determined in step 410 and the first derivative of pressure with respect to time calculated in step 414. In addition, an aperture growth rate is determined from the second derivative of pressure with respect to time in step 440 and factored into the aperture size calculation in step 418 after being reported to flight and ground personnel in step 442.

Given the aperture size and the feeding volume, the critical times may be calculated 420, 422, 424, and 426 in any order and reported 428 to both ground and flight crew personnel. The calculation 420, 422, 424, and 426 of critical times includes generating a function representing a curve 202 and evaluating the function for predetermined pressures to obtain times.

The critical times are reported 428 to flight and ground personnel. The report 428 may be by visual display, audible signals, tactile excitation, or other means detectable by the human senses. For examples, computer screen displays, flashing red lights, and claxon horns may be used to report 428 depressurization.

In step 430, the feeding volume determined in step 410 may be compared with the last-calculated feeding volume to determine if the feeding volume has changed, indicating a change in a hatch state. In an alternate embodiment, in step 430, a second derivative of pressure with respect to time is taken for each compartment to determine changes to the slope of pressure vs. time curve 202. Step 430 output may be used to determine if a hatch closing or opening has occurred. If step 432 indicates a change has not taken place, then no hatch has been closed or opened. A constant or smoothly shrinking feeding volume or, alternatively, a second derivative within a tolerance condition corresponds to curve 202 remaining unchanged past point 306 in FIG. 3. If no hatch has changed state, that fact is reported in step 434 and the process begins again at 404.

If step 432 indicates a step decrease in feeding volume or, alternatively, a negative second derivative exceeding a tolerance, then a hatch has been closed, isolating one or more compartments. A step decrease in feeding volume or alternatively, a negative second derivative exceeding tolerance corresponds to curve 302 in FIG. 3. A step increase in feeding volume or, alternatively, a positive second derivative exceeding a tolerance indicates that a previously closed hatch has been opened. Note that the alternate procedure may not be preferred for low-bandwidth sensor data.

In step 436, compartment groups corresponding to current and previously-calculated feeding volumes are compared to determine which compartments have been added or deleted from the volume of the leaking compartment group. In step 444 and/or step 439, the hatches to the added or deleted compartments are determined to be the hatches that have been opened or closed, respectively. Note that state changes for multiple hatches can quickly be determined by this method. In an alternate embodiment of step 436, the first derivatives of pressure may be tested for each compartment, or cabin, and cabins isolated from the leak are identified as having near zero first derivatives of pressure.

If, in step 438, more cabins are steady, or isolated from leaks than previously, the boundary hatches that are closed are identified in step 444 as being the hatches the leaking compartments and the compartments deleted from the feeding volume. Alternatively, the hatches that have been closed are determined to be those between the steady compartments and the depressurizing compartments. For example, if the previous volume calculation indicated all compartments were contributing to the feeding volume, and the current volume calculation indicates that only compartments 114, 108, and 115 (FIG. 1) are contributing to the feeding volume, then hatches 180 and 186 must have been closed. For an example of the alternate method, referring to FIG. 1, if the leak is in compartment 104 and pressure is falling only in compartments 102, 104, 106, 108 and 115, then hatches 180 and 184 are closed.

If no cabins are isolated, as indicated by the first derivative tests in step 438, then either there are multiple leaks or a hatch was opened. The multiple-leak hypothesis is tested as more hatches are closed. Opened hatches are further discussed below.

If, in step 446, the hatch closing is found to be a new closing, then the hatch is reported closed in step 448. Step 450 eliminates the steady compartments, or cabins, from the search for the leak in either result of step 446. The cabins still considered as possible sources of leaks are identified in step 452 and, if there is more than one, the process continues the search for the leaking compartment at 404. If, in step 454, there is only one compartment with unsteady pressure, that compartment is the leaking compartment and is so reported in step 456. The process then recycles to point 404.

If, in step 432, a step increase in feeding volume is determined, then a hatch has been opened between steady and unsteady compartments. It is understood that opening or closing a hatch between compartments that have both been isolated from the leaking compartment will have no effect on pressure readings for those compartments and so will go undetected by this method. The detection of such hatch state changes is irrelevant to isolating a leak. Opening a hatch at the boundary between leaking and non-leaking compartments corresponds to curve 304 in FIG. 3. The process for analyzing open hatches uses the similar steps as for closed hatches. Opening a hatch changes the result of step 436 and may change the result of step 438. If fewer compartments have effectively zero first derivatives of pressure with respect to time, then step 439 will evaluate which hatches were opened. For example, referring to FIG. 1, if compartments 110 and 113 were initially the only steady compartments and then change to unsteady, then hatch 180 was opened. Step 439 may include a reporting sub-step to advise ground and isolated flight personnel that a hatch has been opened.

Since a leak cannot be isolated by opening hatches, reiterating the estimate of hole growth rate 440 follows step 439, rather than leak isolation steps beginning with step 444. The hole growth rate is reported in step 442 and then the process 400 recycles at point 404. Process 400 will continuously cycle until terminated by human intervention.

Process 400 may detect the operation of a hatch between two neighboring leaking compartments if the sizes of the respective apertures are sufficiently different that the operation of the mutual hatch creates detectable pressure and, therefore, feeding volume differences.

FIG. 5 shows an exemplary embodiment of an apparatus 500 for analyzing spacecraft depressurization events. The apparatus comprises a processor 527 coupled to memory 556 by bus 552. Processor 527 may be a plurality of processors 527 which may be associated using networks and/or buses 552 of any known type. Processor 527 may comprise a dedicated processor chip or any logical device of similar functionality, such as a dedicated logic circuit. The processor 527 is shown and described as electronic but may be magnetic, fluidic, optical, mechanical, or use any other medium known to be suitable for operating logical devices. Memory 556 may be a plurality of memory devices which may be associated using networks and or buses 552 of any known types. Memory 556 may include random access memory (RAM) of any known type, compact disk read-only memory (CD-ROM), memory cards, memory sticks, magnetic tape, laser disk, or similarly functional installed or removable devices. Memory 556 may be magnetic, fluidic, optical, mechanical, or use other known medium for data storage.

Bus 552 further couples storage interface 554, data interface 560, and user interface 562 to processor 527 and memory 556. Bus 552 comprises a data conduit adapted to the devices attached, and may further comprise networks or other data communications channels. Storage interface 590 may include fixed or removable data storage media 595 and may have read and write capabilities for the media. Data regarding compartment volumes 534 and data relating to pressure versus time functions 536 may be stored in storage device 590. Storage device 590 may be a single discrete device or a plurality of interconnected storage devices 590. Data interface 560 comprises a device adapted to receive data 512 from temperature and pressure sensors. Data interface 560 may include an analog-to-digital converter for converting analog signals 512 from pressure and temperature sensors. User interface 562 couples processor 527 to display 564 and to devices not shown for user interactions such as a keyboard, mouse, other data entry devices and other data display and reporting devices.

Within memory 556 resides an exemplary embodiment of a spacecraft leak analyzer, or depressurization analyzer, software program 520. In the depicted embodiment, the leak analyzer program 520 includes a leak, or depressurization, detector module 522, leak predictor module 524, and leak reporter module 525. Leak detector module 522 comprises a software instantiation of steps in the range of 406–416 shown in FIG. 4. In some embodiments, the leak detector module 522 may prompt for user input of data needed in step 410. Leak predictor module 524 comprises a software instantiation of steps referred to in the range of 418 to 426 and step 440 shown in FIG. 4. Leak reporter module 525 comprises a software instantiation of steps 428 and 442.

Leak analyzer module 520 further includes hatch monitor module 530, which comprises a software instantiation of steps referred to in the range of 432 to 456 in FIG. 4. In some embodiments, steps 434, 448, 452, and 456 may be instantiated as hatch reporter 532.

Leak analyzer module 520 may provide internal storage in memory 556 for data relating to the volumes 534 of compartments and to pressure versus temperature functions 536. In some embodiments, data 534 and/or 536 may be stored in memory 556 separately from leak analyzer 520. In some other embodiments, data 534 and/or 536 may be stored in storage device 590.

The exemplary partitioning of software functions and data shown in FIG. 5 may be modified by those of ordinary skill in the art without departing from the scope of the invention.

Figure 6:
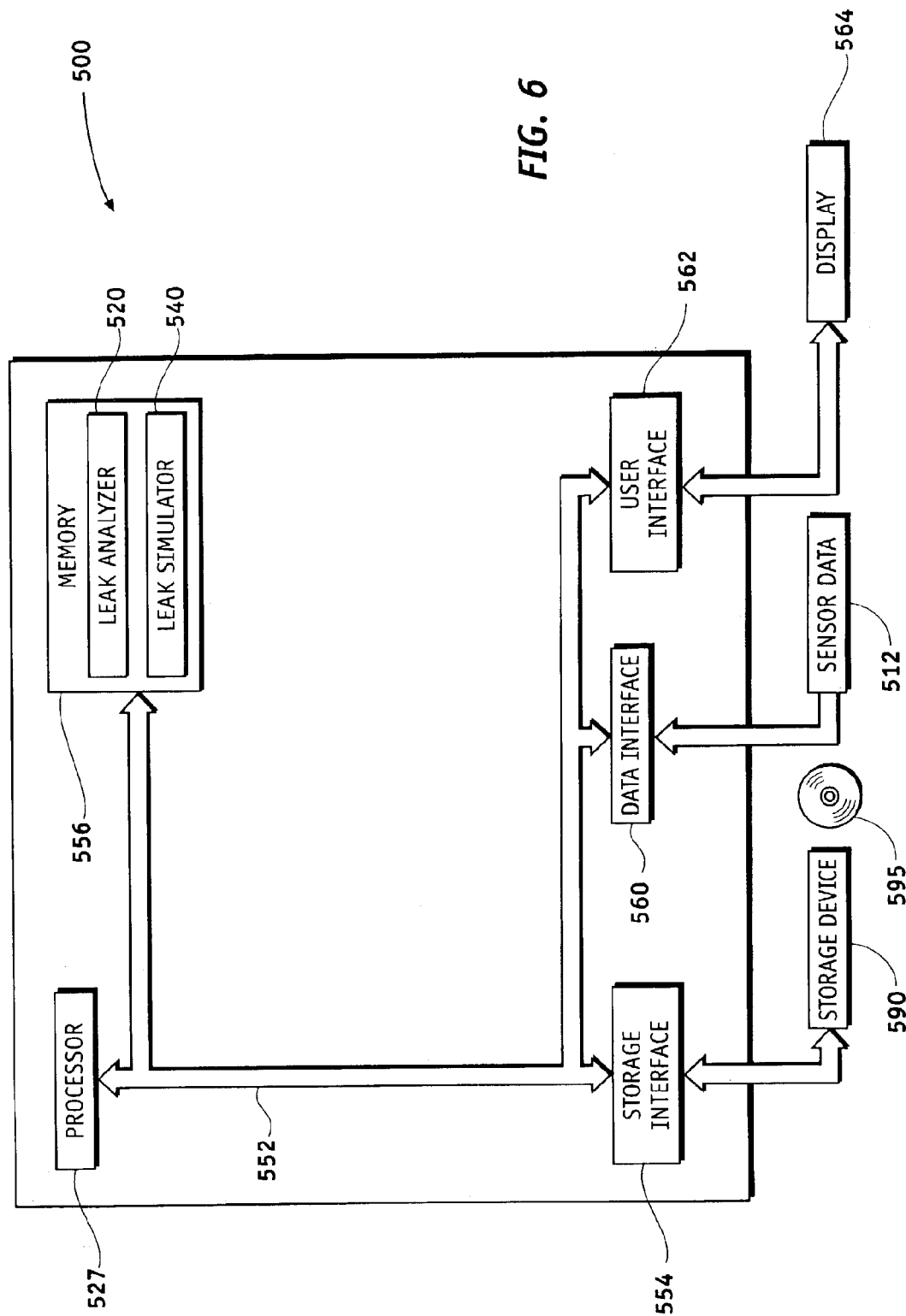
FIG. 6 illustrates an exemplary apparatus for simulating forecasting spacecraft air leak events.

FIG. 6 shows a diagram of an exemplary spacecraft leak analysis simulator that includes a leak analyzer program 520 and a leak simulator program 540 executable to present data simulating an aperture size, pressure and, temperature data, compartments joined with hatches, and other data affecting leak analysis to the leak analyzer program 520 to produce simulated leak analyzer outputs for training and testing. The leak simulator program 540 allows a user to set initial conditions and a time-step and then determines subsequent conditions based upon the laws of physics and further user inputs. For example, after each time step in the simulation, the user may have an option to close or open a hatch.

Figure 7:
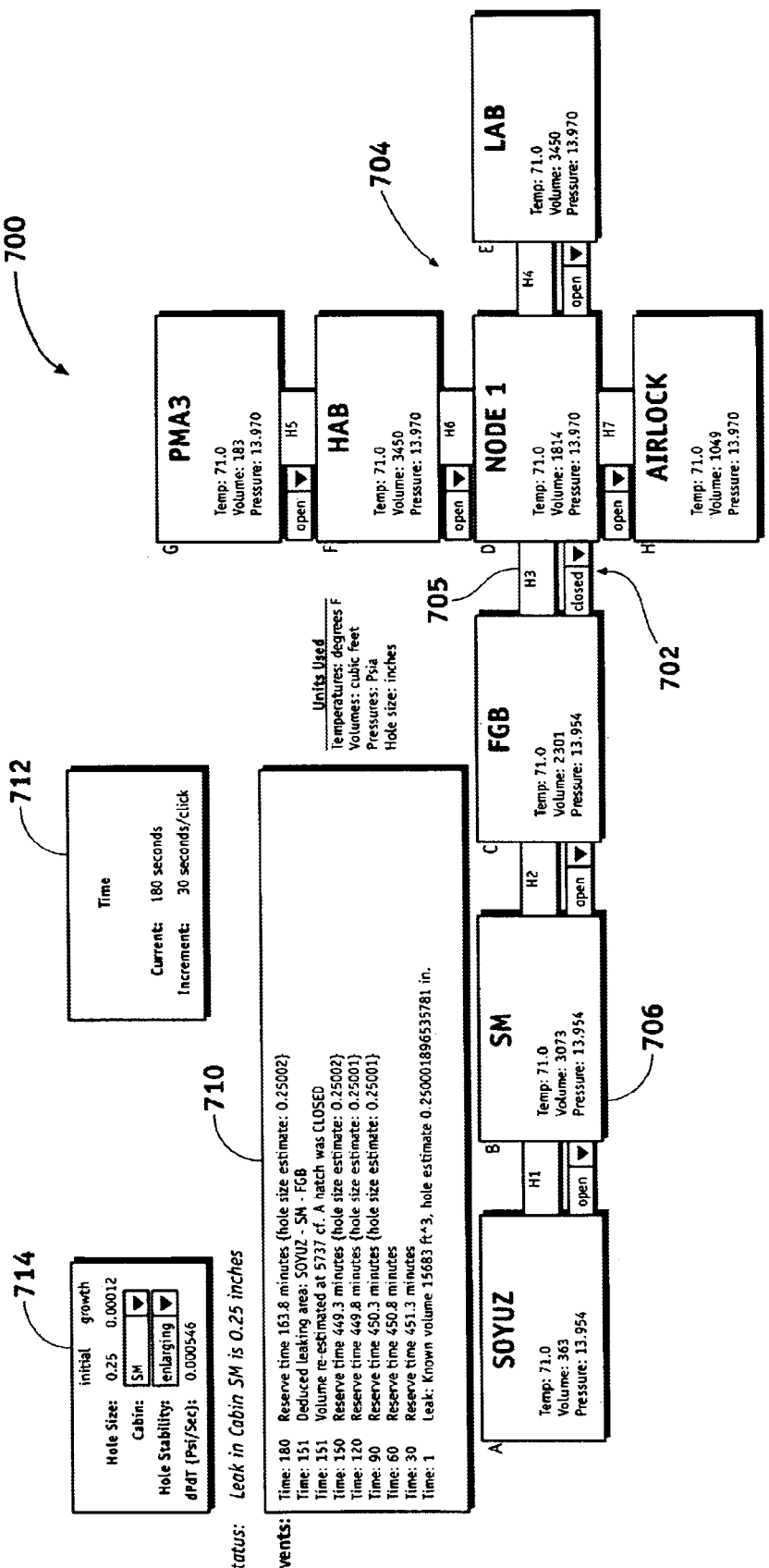
FIG. 7 shows an exemplary screen shot of an exemplary spacecraft leak simulator executed in a spreadsheet.

FIG. 7 shows a partial screen shot of an exemplary spacecraft leak analysis simulator 700 implemented in Visual Basic for Applications (VBA) with a spreadsheet. Other implementations are also contemplated. For example, implementation as a C, FORTRAN, MATLAB, MATHEMATICA, or similar high-order language program is included within the scope of the invention. Likewise, a VBA implementation with a database may be possible. A model of an exemplary spacecraft 704 is provided, and may be user modifiable. User input relating to the leak to be simulated is received in window 714, where the user selects the cabin, hole size, and whether or not the hole is enlarging. In window 712, the user inputs a simulation time step as a number of seconds. By clicking a particular box (not shown), the simulation advances by one time step. At the end of the time step, the user can change the state of a hatch 705 and then continue to step through the simulation 700 to observe the changes caused by changing the state of the hatch 705. Window 710 presents simulation outputs showing the time, the next critical time, an estimate of the hole size, and data relating to hatch state changes. The simulator 700 presents initial and dynamic input data to the spacecraft depressurization analyzer which operates on the simulated data as if it were real data, and the spacecraft depressurization analyzer output may channeled through the simulator 700.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for analyzing a depressurization event resulting from an aperture in a vessel having a compartment having a predetermined volume, the system comprising:
   a pressure sensor configured to sense pressure within the compartment and supply pressure signals representative thereof;
   a temperature sensor configured to sense temperature within the compartment and supply temperature signals representative thereof; and
   a processor coupled to receive the pressure signals and the temperature signals, the processor configured, in response thereto, to:
   determine a first derivative of pressure with respect to time and a feeding volume; and
   determine a size of the aperture based at least in part on the first derivative of pressure with respect to time, the determined feeding, the predetermined volume, the sensed compartment pressure, and the sensed compartment temperature.

2. The system of claim 1, wherein:
   the determined feeding volume is based at least in part on the first derivative of pressure with respect to time, the predetermined volume, the sensed compartment pressure, and the sensed compartment temperature.

3. The system of claim 2, further comprising:
   memory coupled to the processor, the memory having stored therein data that relates aperture size to feeding volume and first derivatives of pressure with respect to time,
   wherein the processor determines the aperture size based at least in part on the stored data.

4. The apparatus of claim 3, wherein the processor is configured with software residing in the memory.

5. The system of claim 1, wherein the processor is further configured to supply information representative of the depressurization event, the system further comprising a reporter coupled to receive information signals from the processor and configured to report depressurization event information.

6. The system of claim 1, wherein the processor is further configured to:
   determine a second derivative of pressure with respect to time in the compartment; and
   determine a rate of growth of the aperture size based at least in part on the second derivative of pressure.

7. The system of claim 1, wherein the processor is further configured to determine one or more times at which one or more predetermined pressures will be reached in the compartment.

8. The system of claim 1, wherein the compartment comprises at least two selectively isolable compartments, the system further comprising:
   a pressure sensor associated with each compartment, each pressure sensor configured to sense pressure within its associated compartment and supply pressure signals representative thereof;
   a temperature sensor associated with each compartment, each temperature sensor configured to sense temperature within its associated compartment and supply temperature signals representative thereof; and
   wherein the processor is further configured to determine the first derivative of pressure with respect to time.

9. The system of claim 8, wherein the at least two selectively isolable compartments comprises a hatch between each pairing of isolable compartments, each hatch movable between an open position, in which the compartments are in fluid communication with one another, and a closed position, in which the compartments are substantially fluidically sealed from one another, and wherein the processor is further configured to
   compare the first derivatives of pressure in each compartment; and
   determine whether the hatch is opened or closed position, based at least in part on the comparison.

10. The system claim 9, further comprising:
    memory coupled to the processor, the memory having stored therein volume data that relates predetermined volumes for each compartment and each fluidically communicable combination of compartments,
    wherein the processor is further configured to determine an exact volume based at least in part on a feeding volume and the volume data and to correlate the exact volume to a particular fluidically communicable combination of compartments having the aperture.

11. The system of claim 10, wherein the processor is further configured to compare a current combination of compartments having the aperture with a previously determined combination of compartments having the aperture to determine:
    the addition of a compartment to the combination of compartments having the aperture and the associated hatch opening; and
    the deletion of a compartment from the combination of compartments having the aperture and the associated hatch closing.

12. The system of claim 9, wherein the processor is further configured to supply a hatch status signal representative of hatch position, and wherein the system further comprises a reporter coupled to receive the hatch status signal from the processor and configured to report hatch status.

13. The apparatus of claim 9, wherein the processor is further configured to repeat the determination of times at which one or more predetermined pressures will be reached each time a hatch is determined to have changed state.

14. A monitor for analyzing depressurization events resulting from an aperture in a vessel having a compartment having a predetermined volume, the monitor comprising:
    a processor adapted to receive one or more pressure signals representative of sensed compartment pressure and one or more temperature signals representative of sensed compartment temperature, and configured, in response thereto, to:
    determine a first derivative of pressure with respect to time and a feeding volume based at least in part on the sensed compartment pressure; and
    estimate a size of a depressurization aperture based at least in part on the first derivative of pressure with respect to time, the determined feeding volume, the predetermined volume, the sensed compartment pressure, and the sensed compartment temperature.

15. The monitor of claim 14, wherein:
    the determined feeding volume is based at least in part on the first derivative of pressure with respect to time, the predetermined volume, the sensed compartment pressure, and the sensed compartment temperature.

16. The monitor of claim 14, further comprising:

a memory coupled to the processor and configured to have stored therein: data relating to the predetermined volume; and data that relates aperture size to feeding volume and first derivatives of pressure with respect to time, wherein the processor is further configured to determine the aperture size based at least in part on the stored data.

17. The monitor of claim 16, wherein the processor is configured with software residing in the memory.

18. The monitor of claim 14, wherein the processor is further configured to supply information representative of the depressurization event.

19. The monitor of claim 14, wherein the processor is further configured to:

determine a second derivative of pressure with respect to time in the compartment; and determine a rate of growth of the aperture size based at least in part on the second derivative of pressure.

20. The monitor of claim 14, wherein the processor is further configured to determine one or more times at which one or more predetermined pressures will be reached in the compartment.

21. The monitor of claim 14, wherein the compartment includes at least two selectively isolable compartments having a hatch there between, each hatch movable between an open position, in which the compartments are in fluid communication with one another, and a closed position, in which the compartments are substantially fluidically sealed from one another, and wherein the processor is further configured to:

compare the first derivatives of pressure in each compartment; and determine whether the hatch is in an open or a closed position, based at least in part on the comparison.

22. The monitor of claim 21, further comprising:

memory coupled to the processor, the memory having stored therein volume data that relates predetermined volumes for each compartment and each fluidically communicable combination of compartments, wherein the processor is further configured to determine an exact volume based at least in part on a feeding volume and the volume data and to correlate the exact volume to a particular fluidically communicable combination of compartments having the aperture.

23. The monitor of claim 22, wherein the processor is further configured to compare a current combination of compartments having the aperture with a previously determined combination of compartments having the aperture to determine:

the addition of a compartment to the combination of compartments having the aperture and the associated hatch opening; and the deletion of a compartment from the combination of compartments having the aperture and the associated hatch closing.

24. The monitor of claim 21, wherein the processor is further configured to supply a hatch status signal representative of hatch position.

25. The monitor of claim 21, wherein the processor is further configured to repeat the determination of times at which one or more predetermined pressures will be reached each time a hatch is determined to have changed state.

26. A method of analyzing depressurization events resulting from an aperture in a vessel including a compartment having a predetermined volume, the method comprising the steps of:

determining pressure, feeding volume, and temperature within the compartment;

determining a first derivative of the pressure with respect to time;

determining whether the compartment is depressurizing based at least in part on the determined first derivative of the pressure with respect to time; and if it is determined that the compartment is depressurizing, determining a size of the aperture based at least in part on the determined first derivative of the pressure with respect to time, the determined feeding volume, the determined compartment pressure, the determined compartment temperature, and the predetermined volume.

27. The method of claim 26, wherein the step of determining the feed volume is based at least in part on the first derivative of pressure with respect to time, the predetermined volume, the sensed compartment pressure, and the sensed compartment temperature.

28. The method of claim 27, wherein the compartment comprises at least two isolable compartments each having a predetermined volume, wherein each pair of isolable compartments has a hatch there between, each hatch having an open position, in which the pair of compartments are in fluidic communication with each other, and a closed position, in which the pair of compartments are substantially sealed from each other, the method further comprising the step of determining an exact volume of a combination of fluidically communicating compartments having the aperture based at least in part on the feeding volume and the predetermined compartment volumes.

29. The method of claim 28, further comprising the steps of:

determining a difference between a current exact volume having the aperture and a previously determined exact volume having the aperture;

determining compartments added to and deleted from the previously determined exact volume based at least in part on the predetermined compartment volumes; and inferring changes in hatch positions based at least in part on the compartments added to and deleted from the previous exact volume.

30. The method of claim 28, further comprising the step of:

determining information relating to the location of the aperture based at least in part on a comparison of the first derivatives of pressure with respect to time in each of the plurality of compartments.

31. The method of claim 27, further comprising the steps of:

accessing data that relates aperture size to feeding volume and to first derivatives of pressure with respect to time; and further determining the aperture size based at least in part on the accessed data.

32. The method of claim 26, further comprising the step of reporting information relating to the depressurization.

33. The method of claim 26, further comprising the step of determining the rate of change of the size of the aperture.

34. The method of claim 33, wherein the step of determining the rate of change of the size of the aperture comprises the steps of:

determining the size of the aperture at a first time;
determining the size of the aperture at a second time, the first time and the second time defining an interval; and
differentiating the size of the aperture over the interval.

35. The method of claim 33, wherein the step of determining the rate of change of the size of the aperture comprises determining a second derivative of pressure with respect to time.

36. The method of claim 33, further comprising the step of predicting one or more times during the depressurization at which one or more predetermined pressures will be reached in the compartment, wherein the predictions are based at least in part on the size of the depressurization aperture, the rate of growth of the depressurization aperture, and the feeding volume.

37. The method of claim 36, wherein the compartment comprises an air-pressurized, human-habitable compartment containing air-cooled equipment, the step of predicting one or more times comprises predicting a time of operational significance.

38. The method of claim 37, wherein the step of predicting one or more times comprises predicting a time when non-essential personnel must be evacuated from the compartment.

39. The method of claim 37, wherein the step of predicting one or more times comprises predicting a time when air-cooled equipment must be shut down in the compartment.

40. The method of claim 37, wherein the step of predicting one or more times comprises predicting a time when pulmonary failure will occur for persons within the compartment.

41. The method of claim 37, wherein the step of predicting one or more times comprises predicting a time when the pressure within the compartment will reach approximately 2 psi.

42. The method of claim 36, wherein the step of predicting one or more times further comprises the step of reporting information regarding times.

43. A program product comprising:
(A) a depressurization analyzer executable on a computer, the analyzer including:
a depressurization detector executable on the computer to detect depressurization and to determine a size of a gas depressurization aperture in a gas-pressurized compartment given temperature, pressure, and volume information relating to gas within the compartment;
a depressurization predictor executable on the computer to determine a rate of growth of the aperture and to determine one or more critical times during the depressurization;
a depressurization reporter executable on the computer to present information regarding the depressurization, including the one or more critical times; and
(B) signal bearing media bearing the depressurization analyzer.

44. The program product of claim 43, wherein the signal bearing media comprises recordable media.

45. The program product of claim 43, wherein the signal bearing media comprises transmission media.

46. The program product of claim 43, wherein the compartment comprises a plurality of isolable compartments sealable with respect to each other by hatches, the depressurization analyzer further comprising a hatch monitor executable on a computer to determine a status of at least one hatch.

47. The program product of claim 46, wherein the hatch monitor is further executable on a computer to determine in which compartment of the plurality of compartments the depressurization aperture is located.

48. The program product of claim 43, wherein the depressurization predictor is further executable on a computer to determine a time at which a predetermined pressure within the compartment will be reached.

49. The program product of claim 43, wherein the depressurization reporter is further executable on a computer to generate display information related to a depressurization.

50. The program product of claim 43, further comprising:
a depressurization simulation adapted to interact with the depressurization analyzer; and
signal bearing media bearing the depressurization simulation.

51. A system for analyzing a depressurization event resulting from an aperture in a vessel having a compartment having a predetermined volume, the system comprising:
a pressure sensor configured to sense pressure within the compartment and supply pressure signals representative thereof;
a temperature sensor configured to sense temperature within the compartment and supply temperature signals representative thereof; and
a processor coupled to receive the pressure signals and the temperature signals, the processor configured, in response thereto, to:
determine a first and a second derivative of pressure with respect to time;
determine a size of the aperture based at least in part on the first derivative of pressure with respect to time, the predetermined volume, the sensed compartment pressure, and the sensed compartment temperature; and
determine a rate of growth of the determined aperture size based at least in part on the second derivative of pressure.

52. A monitor for analyzing depressurization events resulting from an aperture in a vessel having a compartment having a predetermined volume, the monitor comprising:
a processor adapted to receive one or more pressure signals representative of sensed compartment pressure and one or more temperature signals representative of sensed compartment temperature, and configured, in response thereto, to:
determine a first and a second derivative of pressure with respect to time based at least in part on the sensed compartment pressure;
estimate a size of a depressurization aperture based at least in part on the first derivative of pressure with respect to time, the predetermined volume, the sensed compartment pressure, and the sensed compartment temperature; and
determine a rate of growth of the estimated depressurization aperture size based at least in part on the second derivative of pressure.

53. A method of analyzing depressurization events resulting from an aperture in a vessel including a compartment having a predetermined volume, the method comprising the steps of:
determining pressure and temperature within the compartment;
determining a first derivative of the pressure with respect to time;
determining a second derivative of the pressure with respect to time;

determining whether the compartment is depressurizing based at least in part on the determined first derivative of the pressure with respect to time;

if it is determined that the compartment is depressurizing, determining a size of the aperture based at least in part on the determined first derivative of the pressure with respect to time, the determined compartment pressure, the determined compartment temperature, and the predetermined volume; and determining a rate of change of the determined aperture size based at least in part on the second derivative of the pressure with respect to time.

* * * * *